(12) United States Patent
Morvan et al.

(10) Patent No.: US 12,006,470 B2
(45) Date of Patent: Jun. 11, 2024

(54) SULPHONATED INTERNAL KETONE-BASED FORMULATIONS FOR ASSISTED RECOVERY OF OIL

(71) Applicants: IFP ENERGIES NOUVELLES, Rueil-Malmaison (FR); RHODIA OPERATIONS, Aubervilliers (FR)

(72) Inventors: Mikel Morvan, Pessac (FR); Pascal Pitiot, Lyons (FR); Loïc Baussaron, Serpaize (FR); Roberto Company, Bordeaux (FR)

(73) Assignees: RHODIA OPERATIONS, Aubervilliers (FR); IFP Energies Nouvelles, Rueil-Malmaison (FR)

( * ) Notice: Subject to any disclaimer, the term of this patent is extended or adjusted under 35 U.S.C. 154(b) by 591 days.

(21) Appl. No.: 17/258,523

(22) PCT Filed: Jul. 5, 2019

(86) PCT No.: PCT/EP2019/068073
§ 371 (c)(1),
(2) Date: Jan. 7, 2021

(87) PCT Pub. No.: WO2020/016025
PCT Pub. Date: Jan. 23, 2020

(65) Prior Publication Data
US 2021/0269703 A1    Sep. 2, 2021

(30) Foreign Application Priority Data
Jul. 19, 2018   (FR) ..................................... 1856273

(51) Int. Cl.
*C09K 8/584*    (2006.01)
*E21B 43/16*    (2006.01)

(52) U.S. Cl.
CPC .............. *C09K 8/584* (2013.01); *E21B 43/16* (2013.01)

(58) Field of Classification Search
None
See application file for complete search history.

(56) References Cited

U.S. PATENT DOCUMENTS

| 2,989,547 | A  |   | 6/1961  | Whyte |
| 3,024,273 | A  |   | 3/1962  | Whyte et al. |
| 3,268,563 | A  | * | 8/1966  | Shen ..................... C23F 11/163 516/14 |
| 4,022,699 | A  | * | 5/1977  | Holm ..................... C09K 8/584 507/938 |
| 4,784,790 | A  | * | 11/1988 | Disch ................. C11D 3/38618 510/393 |
| 5,223,166 | A  | * | 6/1993  | Disch ....................... C11D 3/33 514/696 |
| 10,800,962 | B2 | * | 10/2020 | Back ..................... C07C 309/07 |
| 11,692,124 | B2 | * | 7/2023  | Back ..................... E21B 43/16 166/305.1 |
| 2008/0103255 | A1 |   | 5/2008  | Reichenbach-Klinke |
| 2013/0143787 | A1 | * | 6/2013  | Siegert .................. C11D 3/221 510/393 |
| 2018/0119002 | A1 | * | 5/2018  | Back ..................... C07C 309/07 |

FOREIGN PATENT DOCUMENTS

| DE | 4220580 A1    | 1/1994 |
| WO | 2016003460 A1 | 1/2016 |
| WO | 2016177817 A1 | 11/2016 |
| WO | 2016177842 A1 | 11/2016 |

\* cited by examiner

*Primary Examiner* — John J Figueroa
(74) *Attorney, Agent, or Firm* — Osha Bergman Watanabe & Burton LLP

(57) ABSTRACT

The present invention relates to compositions for enhanced oil recovery, comprising:
  (A) internal ketones sulfonated alpha to the ketone group; and
  (B) unsulfonated internal ketones,
    with a molar ratio B/(A+B) greater than or equal to the limiting molar concentration of unsulfonated ketones from which a stabilization is observed in the reduction in mobility when the mixture of said ketones is injected into a porous medium.

9 Claims, No Drawings

SULPHONATED INTERNAL KETONE-BASED FORMULATIONS FOR ASSISTED RECOVERY OF OIL

The present application is a U.S. national phase entry under 35 U.S.C. § 371 of International Application No. PCT/EP2019/068073, filed on Jul. 5, 2019, which claims the priority of French Application No. 1856273, filed on Jul. 19, 2018. The entire contents of these applications are explicitly incorporated herein by this reference.

The present invention pertains to the field of petroleum extraction, and more particularly to techniques referred to as enhanced oil recovery.

During the extraction of oil from a hydrocarbon reservoir (oil-yielding reservoir such as a consolidated or non-consolidated rock formation, or a sand, for example), according to a first step known as "primary recovery", the oil is entrained out of a production well by the excess pressure naturally prevailing in the reservoir. This primary recovery gives access to only a small amount of the oil contained in the reservoir, typically at the very most about 10% to 15%.

In order to enable the extraction of the oil to continue after this primary recovery, secondary production methods are employed, when the pressure in the reservoir becomes insufficient to displace the oil that is still in place. Typically, a fluid is injected (reinjection of the produced water, diluted or undiluted, injection of sea or river water, or else injection of gas, for example) within the hydrocarbon reservoir for the purpose of exerting, in the reservoir, an excess pressure capable of entraining the oil toward the production well(s). A common technique in this context is the injection of water (also denoted by the term "water flooding"), in which large volumes of water are injected under pressure into the reservoir via injection wells. The water injected entrains a part of the oil which it encounters and pushes it toward one or more production wells. However, secondary production methods such as waterflooding make it possible to extract only a relatively small part of the hydrocarbons in place (typically about 30%). This partial sweeping is due especially to the trapping of the oil by the capillary forces, to the differences in viscosity and density existing between the injected fluid and the hydrocarbons in place, and also to heterogeneities at microscopic or macroscopic scales (at the scale of the pores and also at the scale of the reservoir).

In an attempt to recover the rest of the oil, which remains in the subterranean formations after implementation of primary and secondary production methods, various techniques have been proposed, referred to as "enhanced oil recovery", abbreviated as EOR (or enhanced (or improved) hydrocarbon recovery, EHR). Among these techniques, mention may be made of techniques similar to the abovementioned water injection (flooding), but using a water comprising additives, for instance water-soluble surfactants (this is then typically referred to as surfactant flooding). The use of such surfactants notably induces a decrease in the water/oil interface tension, which is capable of ensuring more efficient entrainment of the oil trapped in the pore constrictions.

The surfactants usually recommended for EOR are typically anionic surfactants, generally of sulfate or sulfonate type. More particularly, patent application WO 2016/177817 has described compositions useful for EOR which comprise particular sulfonates, namely internal ketones sulfonated alpha to the ketone group, more specifically mixtures of monosulfonated ketones (i.e., ketones sulfonated at only one of the positions alpha to the carbonyl group) and disulfonated ketones (ketones sulfonated at both positions).

The compositions of WO 2016/177817 are typically obtained by sulfonation of internal ketones.

In the context of the studies which led to the present invention, the inventors have now demonstrated that in the most general case, the mixtures of the type described in WO 2016/177817, and more particularly the mixtures in the examples of that patent application, exhibit a drawback in terms of transport in a porous medium.

To be more precise, it is found that injecting the mixtures of WO 2016/177817 results in a constant increase in the reduction in mobility when the mixture is injected, leading to damage to the porous medium.

The "reduction in mobility" (abbreviated Rm) referred to in the present description is a parameter which is well known within the field of petroleum extraction, and it is applied here to the injection of an aqueous surfactant solution. For a given aqueous surfactant solution comprising at least one surfactant and an aqueous solvent medium (which may typically be water or a brine), the value of the reduction in mobility is obtained from the Darcy relationship: it corresponds to the ratio between the head loss measured on injection of the aqueous solution or surfactants, considered at a given flow rate ($\Delta P$ solution) relative to the value of the head loss measured, before injection of the surfactant solution, on injection of the aqueous solvent medium without the surfactants ($\Delta P$ solvent):

$$Rm = \Delta P \text{ solution}/\Delta P \text{ solvent}$$

In the case of a laminar flow of liquid in a porous medium with a section S and a length L, Darcy's law is written as follows:

$$Q = k \frac{1}{\eta} \frac{\Delta P}{L} S$$

where:
Q represents the flow rate of a fluid of viscosity
$\Delta P$ represents the head loss caused by the flow of the fluid,
k represents the permeability, which may be defined as being the hydraulic conductivity of the porous medium, and is expressed in darcys (1 D≈0.987 μm$^2$).

The reduction in mobility Rm defined above corresponds to the effective viscosity of the surfactant solution in the porous medium, and it is by definition greater than 1. The higher the value of Rm for a surfactant solution, the more difficult it proves to inject said solution.

Except if the ratio Rm is unduly high, the existence of an Rm does not per se indicate any particular problem in terms of propagation of the fluid. On the other hand, an increase in the value of the reduction in mobility as the injection is continued indicates a different problem, namely damage to the porous medium over time during the injection. This may typically involve a phenomenon of clogging of the porous structure. This is the problem which is encountered in the most general case with the compositions of the type described in WO 2016/177817. This problem is particularly marked for relatively low flow rates, which are obtained de facto within the porous formation.

One aim of the present invention is to provide compositions based on sulfonated internal ketones that do not lead to this phenomenon of amplification of the reduction in mobility over time.

For this purpose, the inventors have demonstrated an original technical solution: it is found that the effect of an increase in the reduction in mobility may be counteracted by employing sulfonated internal ketones along with a sufficient amount of unsulfonated internal ketones.

What makes this result all the more surprising is that the expectation a priori would have been that the presence of internal ketone compounds would give rise to an increase in the reduction in mobility: the reason is that internal ketones are similar to hydrophobic compounds, and it was therefore more logical to think that their use would give rise to the opposite phenomenon from that obtained.

More singularly still, it is found that the unsulfonated internal ketones provide their effect of inhibiting the increase in the reduction in mobility only when they are employed in a sufficient amount. In other words, and in contrast to what might have been intuitively supposed, the solution discovered by the inventors for preventing the increase in the reduction in mobility involves not only employing additives which, per se, are more likely to give rise to an increase, but also involves employing these additives in a significant proportion.

More specifically, and without wishing to be tied to any particular theory, the studies carried out by the inventors in the context of the present invention show that if unsulfonated internal ketones are added to a composition based on sulfonated internal ketones, there is a limiting value of the molar concentration of unsulfonated ketones (defined by the ratio of the amount of unsulfonated ketones to the total amount of sulfonated and unsulfonated ketones), referred to hereinafter as "limiting molar concentration", such that:

for mixtures based on sulfonated and unsulfonated ketones, with a molar concentration of unsulfonated ketones below the limiting molar concentration, an increase is observed in the reduction in mobility over time when the mixture is injected into a porous medium;

for mixtures based on sulfonated and unsulfonated ketones, with a molar concentration of unsulfonated ketones which is greater than or equal to the limiting molar concentration, the reduction in mobility reaches a limiting value after a short stabilization period, and the reduction in mobility then remains substantially stable over time.

For a given composition of sulfonated ketones and unsulfonated ketones, the limiting molar concentration of unsulfonated ketones may vary within a wide range, depending on the sulfonated ketones and unsulfonated ketones employed. For a given composition, based on specific sulfonated ketones and unsulfonated ketones, the limiting molar concentration may be established experimentally by repetition, testing one molar concentration of unsulfonated ketones and observing the change for the reduction in mobility that is obtained for this concentration. If the reduction in mobility becomes stabilized, the molar concentration tested is greater than or equal to the limiting ratio; otherwise, it is lower. Therefore, by testing a number of molar concentrations, it is readily possible to determine the limiting molar concentration of unsulfonated ketones for a given sulfonated ketones/unsulfonated ketones system, surrounding it by successive approaches.

In the most general case, the limiting molar concentration of unsulfonated ketones for a given sulfonated ketones/unsulfonated ketones system is typically greater than 10% (it is, for example, of the order of 15% for the composition of the illustrative example described in more detail at the end of the present description).

Moreover, in the context of the present invention, preference is given to using unsulfonated ketones as an additive, with a molar concentration of un ketones which is preferably less than 50%, typically less than or equal to 30%, or even than/to 25%.

According to a first aspect, the present invention relates to advantageous compositions identified by the inventors, these being compositions of sulfonated internal ketones which comprise unsulfonated ketones in an amount greater than or equal to the limiting value producing stabilization of the reduction in mobility.

More specifically, the present invention relates to compositions comprising:

(A) internal ketones sulfonated alpha to the ketone group; and (B) unsulfonated internal ketones, with a molar ratio B/(A+B), corresponding to the molar concentration of unsulfonated ketones, which is greater than or equal to the limiting molar concentration of unsulfonated ketones from which a stabilization is observed in the reduction in mobility when the mixture of said sulfonated internal ketones and said unsulfonated internal ketones is injected into a porous medium.

Typically, in a composition according to the invention, the molar ratio B/(A+B) is between 10% and 50%, and it is preferably less than 50%, in particular between 10% and 30%.

According to another aspect, the invention relates to the use of the aforesaid compositions for enhanced oil recovery.

In this context, the invention relates in particular, more specifically, to a method for enhanced oil recovery from an underground formation, wherein:

a composition of the aforesaid type is injected into said underground formation via at least one injection well; and a fluid conveying the oil leaving the underground formation is recovered via at least one production well.

Various features and particular embodiments of the invention will now be described in greater detail.

Internal Ketones Sulfonated Alpha to the Ketone Group (Compounds A)

The sulfonated internal ketone compounds A which are present in the compositions of the invention are advantageously present in the form of a mixture including (i) monosulfonated internal ketones (i.e., internal ketones sulfonated at only one of the positions alpha to the carbonyl group C=O); and (ii) disulfonated internal ketones (i.e., internal ketones sulfonated at both positions alpha to the carbonyl group).

The monosulfonated internal ketones/disulfonated internal ketones ratio is advantageously between 1:99 and 99:1, for example, between 3:97 and 97:3; in particular, between 5:95 and 95:5.

According to one advantageous embodiment, the compounds A present in the composition of the invention comprise a mixture of at least one monosulfonate and at least one disulfonate conforming, respectively, to the formulae (1) and (2) below:

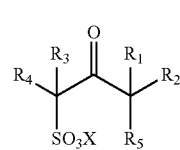

(1)

-continued

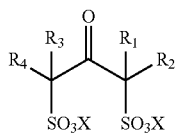
(2)

where:
each of $R_1$, $R_3$ and $R_5$, which are identical or different, is independently a hydrogen or a linear or branched alkyl chain having from 1 to 20 carbon atoms;
each of $R_2$ and $R_4$, which are identical or different, is independently a linear alkyl chain or having from 4 to 24 carbon atoms, it being possible for said alkyl chain to comprise cycloaliphatic groups; and
X is H; or else —$SO_3X$ is a sulfonate salt formed with $1/n$ mol of a cation $X^{n+}$ in which n is the valence of the cation, this cation being advantageously selected from the group consisting of ammonium cations NH and metal cations, especially alkali metal and alkaline earth metal cations such as sodium, potassium, calcium and magnesium cations.

Preferably, each of $R_1$, $R_3$ and $R_5$ is a hydrogen or else an alkyl group having from 1 to 6 carbon atoms, and preferably each of $R_1$, $R_3$ and $R_5$ denotes a hydrogen or a methyl, ethyl, propyl, butyl, pentyl or hexyl group; and advantageously a hydrogen.

Each of $R_2$ and $R_4$ preferably contains from 6 to 18 carbon atoms and more preferably from 6 to 14 carbon atoms.

The compounds of formula (1) and (2) are preferably obtained by sulfonation of internal ketones obtained from fatty acids or else a mixture of fatty acids, typically by using the Piria reaction. Fatty acids highly suitable as a starting point for the synthesis of the compounds of formula (1) and (2) include caprylic, capric, lauric, myristic, palmitic, stearic, arachidic, behenic, lignoceric and cerotic acids and mixtures thereof. It is also possible to start from some of their derivatives, such as their esters and their anhydrides. Preferred fatty acids are caprylic, capric, lauric, myristic, palmitic, stearic, naphthenic and isostearic acids and mixtures thereof.

It is possible in particular to start from mixtures of fatty acids in the form of "cuts" obtained from vegetable or animal oils, particularly by hydrolysis or alcoholysis. Good candidates are the acids obtained from coconut oil or from palm oil, which comprise fatty acids containing 8 to 18 carbon atoms.

The starting fatty acids may optionally comprise one or more ethylenic unsaturations, as is the case, for example, with oleic, linolenic or erucic acids. Generally speaking, however, preference will be given to avoiding the presence of such unsaturations, owing to the fact that the double bonds are subject to sulfonation and consequently lead to mixtures of less well-defined structures than with the alkyl chains devoid of double bonds.

Other internal ketones suitable for the preparation of sulfonated internal ketones according to the invention are those derived from naphthenic acids.

The sulfonates of formula (1) or (2) may be obtained from a single internal ketone with a well-defined composition. The sulfonates of formula (1) or (2) are usually obtained from a mixture of two or more distinct internal ketones, meaning that the sulfonated internal ketones are mixtures comprising two or more compounds of formula (1) and (2) having distinct chain lengths.

Unsulfonated Internal Ketones
(Compounds B)

According to one advantageous embodiment, the compounds B present in a composition according to the invention correspond to the unsulfonated version of the compounds A additionally present.

Therefore, typically, when the compounds A are monosulfonated disulfonate compounds conforming, respectively, to the aforesaid formulae (1) and (2), the compounds B conform preferably to the formula (3) below:

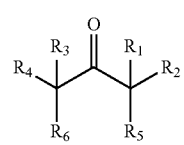
(3)

where:
$R_1$, $R_2$, $R_3$, $R_4$ and $R_5$ have the aforesaid meanings; and
$R_6$ is a hydrogen or else a linear or branched alkyl chain having from 1 to 20 carbon atoms, preferably a hydrogen.

According to one particularly advantageous embodiment, a composition according to the invention is prepared by only partly sulfonating a compound of formula (3) or else a mixture of compounds of formula (3) using a sulfonating agent. The product is then a mixture of compounds of formulae (1) and (2), constituting the compounds A of the composition, and residual compounds of formula (3), constituting the compounds B of the composition.

According to this embodiment, the partial sulfonation of the compounds of formula (3) is advantageously conducted such that the molar concentration of unsulfonated ketones at the end of the sulfonation is at least equal to the limiting molar concentration providing stabilization of the reduction in mobility.

The partial sulfonation of the compounds of formula (3) may in theory be carried out using any suitable sulfonated agent. For example, using a sulfonating agent, advantageously a concentrated sulfonating agent, selected from sulfuric acid, sulfuric acid monohydrate, an oleum, chlorosulfonic acid, sulfonic acid and sulfur trioxide $SO_3$.

According to one advantageous embodiment, the sulfonation is performed using gaseous sulfur trioxide $SO_3$ as sulfonating agent, preferably by using the falling-film technique.

At the end of the sulfonation, the reaction mixture may advantageously be subjected to ageing. Furthermore, it is advantageous in general to neutralize the reaction mixture with a basic compound, typically NaOH, this neutralization being advantageously performed with stirring, and preferably at a temperature of 40 to 100° C. for 15 minutes to 5 hours, typically between 40 minutes and 3 hours.

Possible Additives

A composition according to the invention may advantageously comprise a certain number of additives in addition to compounds A and B.

It is advantageous in particular, therefore, for the composition according to the invention to comprise the compounds A and B within an aqueous medium comprising dissolved salts, typically a brine.

The salinity of this aqueous medium containing dissolved salts is preferably similar to that of the underground formation into which the composition according to the invention is to be injected, thereby tending to improve the efficacy of oil recovery.

The total amounts of salts in a composition according to the invention, typically, is advantageously in the range between 1 to 200 g/L, preferably from 5 to 150 g/L.

Salts advantageously present in the composition of the invention may include, in particular and without limitation, the halides of alkali metals and alkaline earth metals, such as NaCl, KCl, RbCl, CsCl, MgCl, $BeCl_2$ and $CaCl_2$).

A composition according to the invention generally comprises two or more types of distinct salts, and the concentration of salts referred to corresponds to the total amount of all of the salts present.

Typically, in a composition according to the invention comprising a saline aqueous medium of the aforesaid type, the total concentration of compounds A and B within said saline aqueous medium is between 0.5 and 50 g/L, preferably between 1 and 30 g/L, for example, between 2 and 20 g/L.

Furthermore, a composition according to the invention may advantageously comprise other additives, especially additives enhancing the quality of oil recovery.

Accordingly, as a nonlimiting example, a composition according to the invention may advantageously comprise additional surfactants, examples being nonionic surfactants, selected for example, where appropriate, from alkoxylated nonyl phenols, alkoxylated dinonylphenols and alkoxylates particularly of branched C8 to C20 alcohols. Additional sulfated, phosphate or carboxylated surfactants, or sulfonated surfactants other than the compounds A.

Advantageous surfactants in the context of the present invention are the alkyl glyceryl ether sulfonates (AGES), examples being those obtained by the processes described in U.S. Pat. No. 3,024,273 or U.S. Pat. No. 2,989,547.

The AGES may be described by the following general formula:

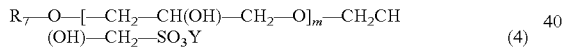

(4)

in which:
R_7 represents a linear or branched alkyl or alkenyl chain having typically from 3 to 32 carbon atoms;
m is 0 or else m is an integer of from 1 to 20, preferably 2 to 15;
Y is a cation preferably selected from the group consisting of sodium, potassium, ammonium, calcium or magnesium.

Other additional surfactants of potential advantage in the context of the present invention are alkoxylated alkyl glyceryl ether sulfonates (AAGES), which conform to the following formula (5):

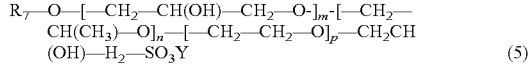

(5)

in which:
$R_7$, m and Y have the meanings given for the aforesaid formula (4); and
each of n and p, which are identical or different, is an integer of from 0 to 20, preferably from 2 to 15, with the proviso that n+p is not zero.

When AGES or AAGES compounds are present in a composition according to the invention, they are typically present in an amount of between 0.5 and 50 g/L, preferably between 1 and 25 g/L.

According to one particular embodiment, AGES or AAGES may be employed jointly, where appropriate with an AGES/AAGES ratio by mass of between 1:10 and 10:1, preferably from 1:5 to 5:1.

Various aspects and advantages of the invention will be further illustrated by the illustrated example given hereinafter.

EXAMPLE

In this example, a mixture of ketones obtained from the partial sulfonation of an internal ketone was used.

The internal ketone used is a C23-35 internal ketone which was obtained by Piria reaction catalyzed with magnetite.

The partial sulfonization was carried out using gaseous $SO_3$ in a falling-film reactor cooled with water via a jacket, under the following conditions:
concentration of 503 in air: 5% v/v
rate of sulfur feed: 1.5 kg Sit
estimated conversion SO2→SO3: 97%
feed rate of internal ketone: 12.3 kg/h;
At the end of the sulfonation, the product was a mixture M of sulfonated and unsulfonated internal ketones, having the following concentrations (determined by NMR analyses):
A. Sulfonated Internal Ketones
Monosulfonated internal ketones: 43.7 mol %
Disulfonated internal ketones: 32.4 mol %
B. Residual Unsulfonated Internal Ketones:
24 mol %
A portion of the resulting mixture M was then treated by the protocol below to remove the residual unsulfonated internal ketones therein:
Dispersion of 30 g of mixture M in 70 g of silica in a solvent (CHCl3).
Removal of the solvent using a rotary evaporator.
Application to a 330 g silica (flash chromatography) column conditioned with 100% cyclohexane.
Elution of the unsulfonated residual internal ketones with cyclohexane/AcOEt (80:20). Evaporation of this fraction to dryness gives 4.4 g of orange wax (KI characterized by 1H NMR).
Elution of the rest of the sample with CH2Cl2/MeOH (80:20). Evaporation of this fraction to dryness gives 24.1 g of black oil.
23 g of this oil introduced into a 500 ml round-bottomed flask and neutralized at 60° C. with 2.2 equivalents of 2N sodium hydroxide, relative to the acidity of the sample measured by potentiometry.
After neutralization, the crude product is brought to ambient temperature and lyophilized, to give 26.3 g of brown solid.

At the end of the protocol, a mixture MO was obtained which is substantially free from residual internal ketones and constitutes essentially sulfonated internal ketones contained in the mixture M.

Starting from the mixtures M and MO, two compositions C and CO are prepared, intended for the injection tests, the formulations of these compositions being as follows:

| Composition C: | Composition C0: |
|---|---|
| Mixture M: 2 g/l | Mixture M0: 2 g/l |
| AGES Exx C13 7 PO 6 EO: 6 g/l | AGES Exx C13 7 PO 6 EO: 6 g/l |
| NaCl: 81 g/l | NaCl: 81 g/l |

The mixing of compositions C and C0 in varying proportions gave five solutions 1 to 5, described in the table below, which contain variable amounts of residual internal ketones, as reported in the column on the far right; the value reported is expressed as a percentage and corresponds to the molar concentration of compound A, namely the ratio A/(A+B).

TABLE 1

Composition of the solutions injected into the porous medium

| Solution no. | Ratio Composition C/Composition C0 | residual internal ketones |
|---|---|---|
| 1 | 1/0 | 24% |
| 2 | 0/1 | 0 |
| 3 | 0.5/0.5 | 12% |
| 4 | 0.75/0.25 | 18% |
| 5 | 0.625/0.375 | 15% |

Note:
Solution 1 corresponds to composition C, solution 2 to composition C0

The five solutions thus prepared were subjected to an injection test under the following conditions.

Cylindrical samples of commercial Bentheimer-type rock with the characteristics described in table 2 were used as porous medium for studying the flow of the solutions described in table 1.

TABLE 2

Characteristics of the porous medium

| Diameter (cm) | 1.2 |
|---|---|
| Length (cm) | 5 |
| Permeability (Da) | 1 |
| Pore volume (ml) | 1.5 |

This test was conducted under the following conditions:

The system is maintained at 60° C. in an oven. The fluid injection rate is 0.0165 ml/min (corresponding to shearing of 15 s$^{-1}$ on the fluid as it propagates in the medium). Pressure sensors measure the difference in pressure at the extents of the porous medium. The pressure measurements are used as a basis for determining the reduction in mobility Rm of the surfactant solution.

The results of the plots of Rm as a function of the pore volume injected (PV) allow the establishment, for each solution, of the profile adopted for the change in Rm.

These tests show that in this specific example, the value of the limiting molar concentration of unsulfonated internal ketones is of the order of 15 mol %.

For solutions 1, 4 and 5, which correspond to compositions according to the present invention, and where the amount of unsulfonated residual internal ketones is sufficient, a stabilization of the Rm value is obtained, which rapidly ceases its divergence.

In contrast, for solutions 2 and 3, where the amount is lower, the change profile is different, with a continuous increase in the reduction in mobility on injection of the surfactant solution, signifying that the surfactant solution damages the porous medium.

The invention claimed is:

1. A composition suitable for enhanced oil recovery, comprising:
(A) internal ketones sulfonated alpha to the ketone group; and
(B) unsulfonated internal ketones,
with a molar ratio B/(A+B), corresponding to the molar concentration of unsulfonated ketones, ranging between 10% and 50%.

2. The composition as claimed in claim 1, wherein the compounds A comprise a mixture of at least one monosulfonate and at least one disulfonate, conforming respectively to the formulae (1) and (2) below:

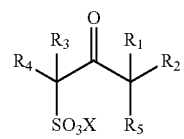

(1)

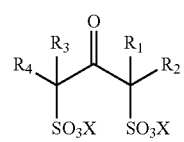

(2)

where:
each of $R_1$, $R_3$ and $R_5$, which are identical or different, is independently a hydrogen or a linear or branched alkyl chain having from 1 to 20 carbon atoms;
each of $R_2$ and $R_4$, which are identical or different, is independently a linear alkyl chain or having from 4 to 24 carbon atoms, it being possible for said alkyl chain to comprise cycloaliphatic groups; and
X is H; or else —$SO_3X$ is a sulfonate salt formed with 1/n mol of a cation $X^{n+}$ in which n is the valence of the cation.

3. The composition as claimed in claim 2, wherein the compounds B conform to the formula (3) below:

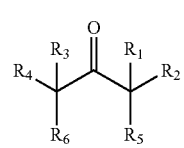

(3)

where:
each of $R_1$, $R_3$ and $R_5$, which are identical or different, is independently a hydrogen or a linear or branched alkyl chain having from 1 to 20 carbon atoms;
each of $R_2$ and $R_4$, which are identical or different, is independently a linear alkyl chain or having from 4 to 24 carbon atoms, it being possible for said alkyl chain to comprise cycloaliphatic groups; and
$R_6$ is a hydrogen or else a linear or branched alkyl chain having from 1 to 20 carbon atoms.

4. The composition as claimed in claim 3, which is prepared by only partial sulfonation of a compound of formula (3) or else a mixture of compounds of formula (3) using a sulfonating agent.

5. The composition as claimed in claim 4, wherein the sulfonation is performed using gaseous sulfur trioxide $SO_3$ as sulfonating agent.

6. The composition as claimed in claim 5, wherein the sulfonation is further performed using the falling-film technique.

7. The composition as claimed in claim 1, further comprising:
   an aqueous medium comprising dissolved salts; and/or
   an anionic surfactant.

8. The composition as claimed in claim 7, wherein the anionic surfactant is an AGES or an AAGES.

9. A method for enhanced oil recovery from an underground formation, the method comprising:
   injecting a composition as claimed in claim 1 into said underground formation via at least one injection well; and
   recovering a fluid conveying the oil leaving the underground formation via at least one production well.

\* \* \* \* \*